(12) United States Patent
Snyder et al.*

(10) Patent No.: US 6,240,479 B1
(45) Date of Patent: *May 29, 2001

(54) METHOD AND APPARATUS FOR TRANSFERRING DATA ON A SPLIT BUS IN A DATA PROCESSING SYSTEM

(75) Inventors: Michael Dean Snyder; David William Todd, both of Austin; Brian Keith Reynolds, Round Rock; Michael Julio Garcia, Austin, all of TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,459

(22) Filed: Jul. 31, 1998

(51) Int. Cl.[7] .................................................. G06F 13/362
(52) U.S. Cl. ............................ 710/113; 710/116; 710/240
(58) Field of Search .................................. 710/113, 116, 710/240, 241

(56) References Cited

U.S. PATENT DOCUMENTS

| | | | |
|---|---|---|---|
| 5,036,456 | * | 7/1991 | Koegel . |
| 5,548,795 | * | 8/1996 | Au ........................................... 710/52 |
| 5,699,516 | | 12/1997 | Sapir et al. ........................... 709/200 |
| 5,778,434 | * | 7/1998 | Nguyen et al. ....................... 711/137 |
| 5,790,813 | * | 8/1998 | Whittaker ............................. 710/113 |
| 5,890,222 | * | 7/1998 | Agarwal et al. ..................... 711/220 |
| 5,901,295 | * | 5/1999 | Yazdy ................................... 710/113 |
| 5,923,579 | * | 7/1999 | Widigen et al. ................ 364/786.01 |
| 6,052,379 | * | 4/2000 | Iverson et al. ....................... 370/442 |

OTHER PUBLICATIONS

International Business Machines Corp., "6XX/System Bus Description", Jan. 15, 1996, Buc Doc. 5.2.1, pp. 1–114.
William R. Bryg et al., "A High Performance, Low-Cost Multiprocessor Bus for Workstations and Midrange Servers", Feb. 1996 Hewlett–Packard Journal, pp. and "Runway Bus Electrical Design Considerations", pp. 1–3.

* cited by examiner

Primary Examiner—Ario Etienne
(74) Attorney, Agent, or Firm—James L. Clingan, Jr.

(57) ABSTRACT

A bus protocol for a split bus (50, 60) where each device (10, 20, 30) coupled to the bus has an age-based queue (12, 24, 34) of pending transactions. Queues are updated as transactions are executed. A central arbiter (40) has a copy of each device's queue (44). A priority transaction is determined from among all the queues in the arbiter. A data transaction index (DTI) is broadcast during the data tenure to all devices indicating the position in the queue of the next transaction. The index allows out-of-order data transfers without the provision of a static tag during the address tenure. Queues maintain a history of pending transactions. In one embodiment, each device receives a separate data bus grant (DBG), allowing a single provision of the index to both a source and a sink device.

4 Claims, 7 Drawing Sheets

METHOD AND APPARATUS FOR TRANSFERRING DATA ON A SPLIT BUS IN A DATA PROCESSING SYSTEM

FIELD OF THE INVENTION

The present invention relates generally to data processing systems, and more particularly to a method for transferring data on a split bus.

BACKGROUND OF THE INVENTION

Many data processing systems include multiple microprocessors, devices, and memories, where each performs transactions using a common set of buses. When the address bus and the data bus are split, it is possible to reorder data to maximize the use of the data bus. In a split transaction bus such as this, the address tenure is the period of time during which the address for a given transaction is valid on the address bus, and the data tenure is the period of time during which data for a given transaction is valid on the data bus. The address tenures are provided in a first order, while the data tenures may be reordered to optimize the transmission of data. This is useful, for example, when a long transaction (i.e. a transaction which requires multiple cycles to perform) is followed by several shorter transactions. As the recipient of the data does not always have access to the reordering scheme, it is necessary to provide a mechanism for identifying the data with its corresponding address.

Some split transaction bus systems use bus protocols having a static tagging mechanism, where an identifier is attached to each address and then a corresponding identifier is attached to each data. Such static tagging methods require a unique tag be broadcast with the address during the address tenure. The tag is then stored by the device which is targeted in the transaction. In some systems the tag is also stored in a system arbitration controller. When the corresponding data is selected the tag is rebroadcast along with the data during the data tenure. In this case, both the address bus and the data bus must be expanded for provision of the tag information. The tag information is provided for a single transaction to both the data source (i.e. the device providing the data) and the data sink (i.e. the device receiving the data).

There is a need for a method of identifying address and data combinations which does not require the additional overhead of providing tag information with the address tenure.

BRIEF DESCRIPTION OF THE FIGURES

The present invention is illustrated by way of example and not limitation in the accompanying figures, in which like references indicate similar elements, and in which.

DETAILED DESCRIPTION OF THE FIGURES

In one aspect of the present invention, a method of performing transactions in a data processing system includes the step of receiving a plurality of transaction indicators representing a plurality of transactions, assigning a unique transaction index value to each of the plurality of transaction indicators, executing a first one of the plurality of transactions, wherein a second one of the plurality of transactions has been pending longer than the first one of the plurality of transactions, and reassigning at least one of the unique transaction index values.

According to another aspect of the present invention, a data processing system includes a first circuitry capable of receiving a plurality of transaction indicators representing a plurality of transactions, a second circuitry capable of assigning a unique transaction index value to each of the plurality of transaction indicators, a third circuitry capable of executing a first one of the plurality of transactions, wherein a second one of the plurality of transactions is older than the first one of the plurality of transactions, and a fourth circuitry capable of reassigning at least one of the unique transaction index values.

According to another embodiment of the present invention, a method of performing data transactions in a data processing system includes storing a first identifier of a first transaction and a second identifier of a second transaction into a first device queue corresponding to a first device, wherein the first identifier is stored in a first position in the first device queue and the second identifier is stored in a second position in the first device queue, wherein the first position is different from the second position. The method continues by generating a first data transaction index signal and a first data bus grant signal to the first device at a first time, wherein the first data transaction index signal corresponds to the first position. The first device queue is then reordered such that the second identifier is moved from the second position to a third position in the first device queue, wherein the third position is different from the second position. Finally, the method continues by generating a second data transaction index signal and a second data bus grant signal to the second device at a second time subsequent to the first time, wherein the second data transaction index signal corresponds to the third position.

Figure 1:
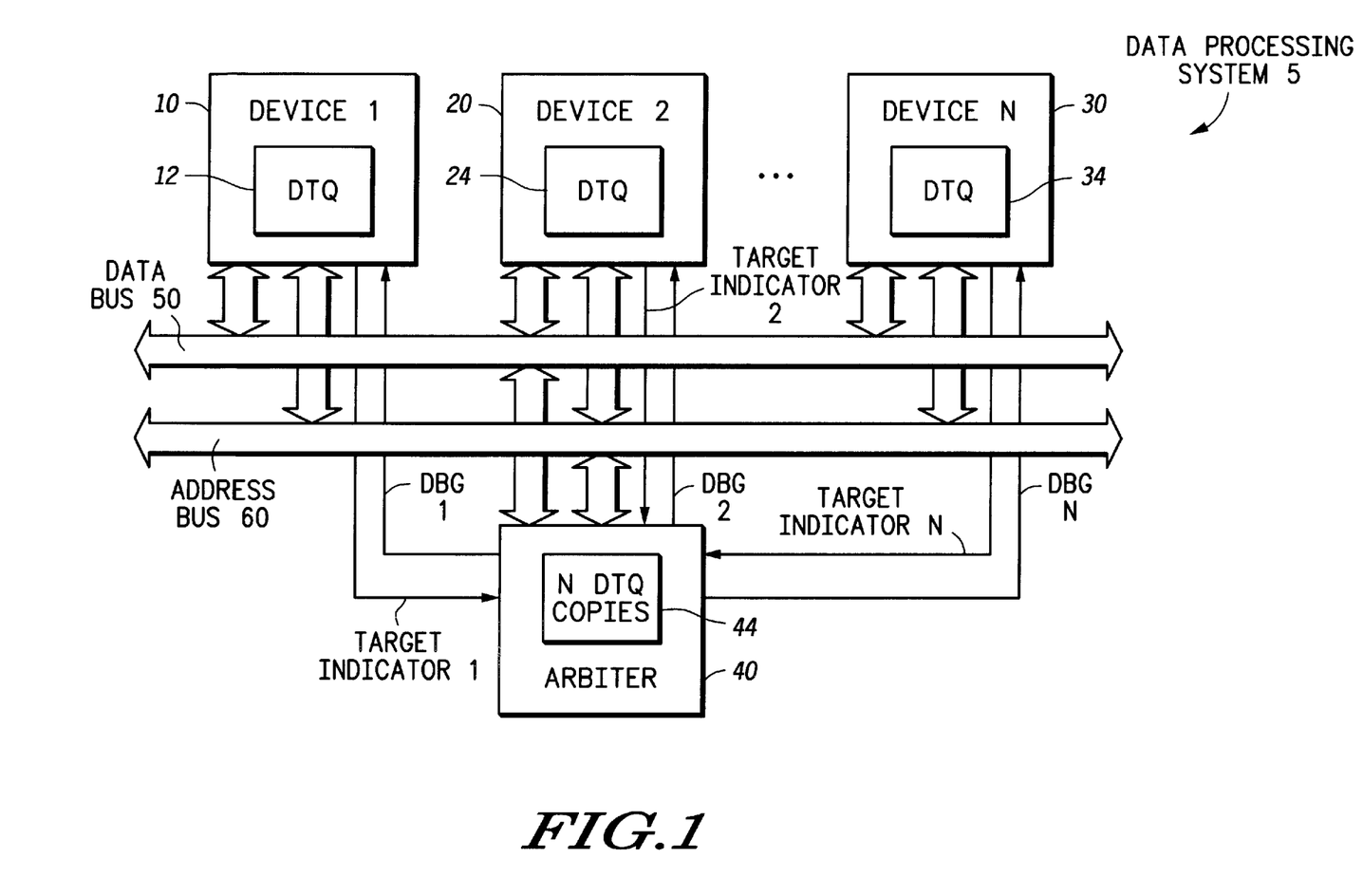
FIG. 1 illustrates, in block diagram form, a data processing system according to one embodiment of the present invention.

FIG. 1 illustrates one embodiment of the present invention, having a data processing system 5 which includes multiple devices coupled to a common communication bus. The communication bus is a split bus, having an address portion, labeled address bus 60, and a data portion, labeled data bus 50. The data portion is also used for the transmission of reordering information.

Data processing system 5 includes device 10, device 20, through device 30, and arbiter 40. The devices are labeled 1 to N. Device 10, device 20, through device 30 are all bi-directionally coupled to data bus 50 and address bus 60. Address bus 60 is used to transfer address information within data processing system 5. Data bus 50 is used for the transfer of data information and a data transaction index, referred to as "DTI," within data processing system 5.

Arbiter 40 is bi-directionally coupled to address bus 60 and data bus 50. Arbiter 40 includes N copies of data transfer queues (DTQ) 44, one corresponding to each of the devices coupled to the common split communication bus. Transaction information is stored in the queues to form a historical list. The oldest pending transactions are at the bottom of the queue and the newest on the top. Transactions are not necessarily removed from the queue in order of age, but the age-based list is maintained even as transactions are removed from the queue. Arbiter 40 provides a data bus grant signal to each of device 10, device 20 through device 30. Arbiter 40 receives a target indication from each of the devices as that device recognizes itself as the target. Within data processing system 5, each of the devices coupled to data bus 50 and address bus 60 may operate as a master or as a slave or both. The master indicates the device which controls the bus; a master may be a data source or a data sink. Further, for any individual transaction on data 50 and address bus 60, any device may source or sink data.

The data processing system illustrated in FIG. 1 may include any number or type of devices coupled to the common bus, where all devices are adapted to utilize the bus protocol. The arbiter may include other logic blocks or functional units.

Figure 2:
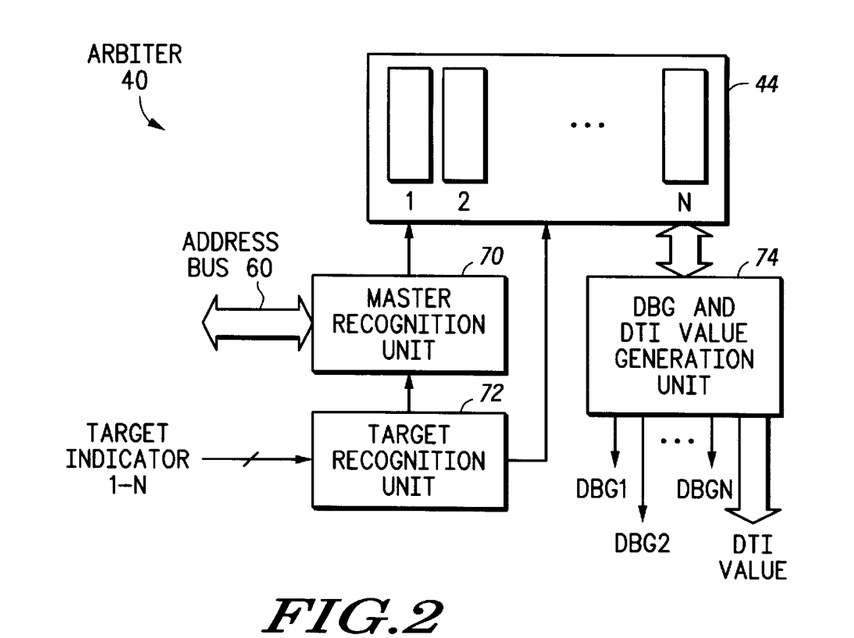
FIG. 2 illustrates, in block diagram form, an arbiter, of the data processing system of FIG. 1, according to one embodiment of the present invention.

FIG. 2 illustrates arbiter 40 of FIG. 1, in further detail. The arbiter includes a block 44, a master recognition unit 70, a target recognition unit 72, and a data bus grant (DBG) and DTI value generation unit 74. Block 44 contains multiple queues, labeled 1, 2, through N, each corresponding to devices 10, 20,. . . 30 of FIG. 1.,respectively Each of the queues 1, 2,. . . N is a copy of the respective one of queues 12, 24,. . . 34 resident in the corresponding device 10, 20,. . . 30. The queue is used to keep track of transactions on address bus 60 and data bus 50. As an address is provided on the bus, an identifier is placed in the queue. This allows identification of the reordered data for each address. By providing a queue of pending transactions for each device, the arbiter is able to order transactions efficiently without requiring the tag information be placed with the address.

The arbiter uses a data transaction index (DTI) during a data tenure. The DTI acts as a pointer into the queue of outstanding data transactions for a given master or slave. The information in the queue indicates which transaction is to be served by the subsequent data tenure. According to one embodiment, a small DTI value indicates an older transaction, i.e. one that has been pending for a while; similarly a large DTI value indicates a more recent transaction. For example, for a three bit index, DTI[0:2], DTI= 000 selects the oldest transaction, while DTI=111 selects the eighth oldest transaction. The DTI signals for a given data bus tenure are driven by the system at a time relative to the associated data bus grant (DBG).

Also included in arbiter 40 is master recognition unit 70 and target recognition unit 72, each coupled to block 44. Referring again to FIG. 1, each of the devices coupled to the split bus monitor the bus for transactions having one of their addresses, i.e. targets the device. If a device detects that it is the target of a transaction, the device sends a target indication signal to target recognition unit 72. Target recognition unit 72 then provides the transaction target information to block 44 to identify the targeted device and its corresponding queue in unit 44. For example, device 10 corresponds to queue 1 of block 44. When device 10 is the targeted device, device 10 will provide a target indication signal to arbiter 40. Upon receipt of the target indication signal from device 10, target recognition unit 72 will provide information to block 44 which selects queue 1, the queue corresponding to device 10.

The master recognition unit 70 identifies a needed data transaction due to an address tenure performed by a master. Master recognition unit 70 is coupled to address bus 60, from which it receives address information corresponding to transactions to be performed on data bus 50. Address information includes the address of the data access, and also may include information regarding the type of transactions, such as size of data accessed, etc. Master recognition unit 70 provides transaction information received from address bus 60 to block 44. The information from master recognition unit 70 is used to provide the contents of the selected queue.

Arbiter 40 also includes DBG and DTI value generation unit 74, which is bi-directionally coupled to block 44. DBG and DTI value generation unit 74 generates individual data bus grant signals, DBG1, DBG2, through DBGN, and also generates a DTI value which is provided to each of the devices coupled to the bus. For a given transaction DBG and DTI value generation unit 74 determines which transaction indicator from which queue in block 44 corresponds to the next transaction. The DTI value corresponding to this next transaction is driven with the appropriate DBG to perform that transaction's data tenure.

Figure 3:
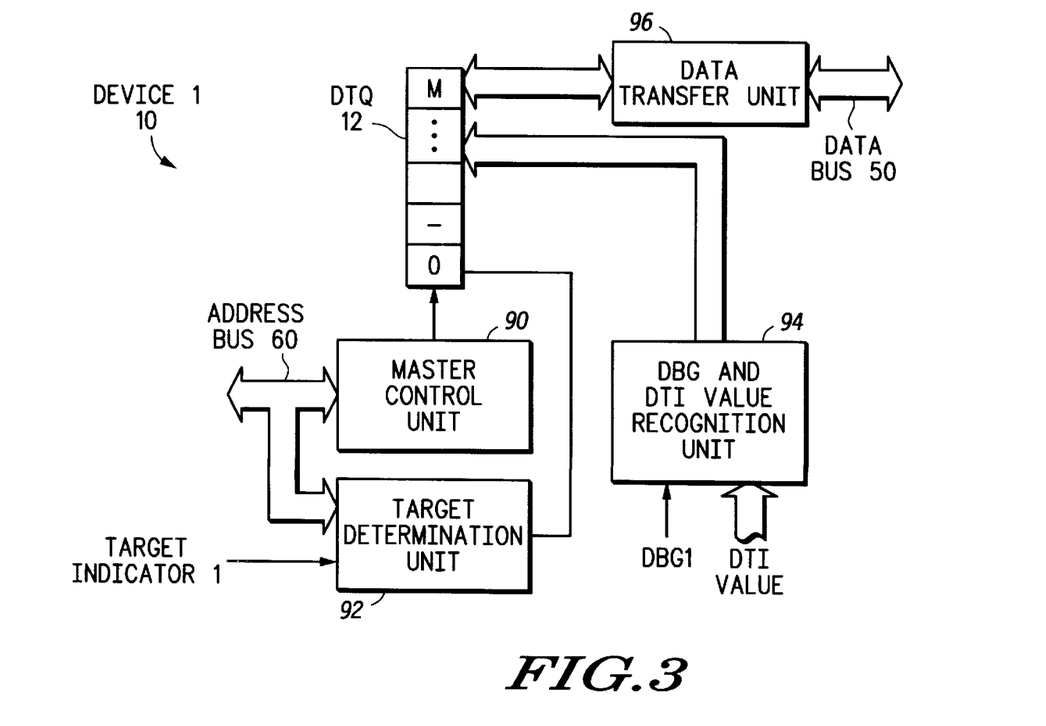
FIG. 3 illustrates, in block diagram form, a device, of the data processing system of FIG. 1, according to one embodiment of the present invention.

FIG. 3 illustrates, in detailed form, device 10 of FIG. 1. Device 10 includes a master control unit 90, a target determination unit 92, a DBG and DTI value recognition unit 94, and a data transaction queue (DTQ) 12. Data transfer unit 96 is bi-directionally coupled to data bus 50 from which data transfer unit 96 receives data and transaction information. Data transfer unit 96 is also bi-directionally coupled to data transaction queue (DTQ) 12. DTQ 12 contains entries indexed from O to M. Each of the entries represents a master or slave transaction which has been provided to arbiter 40. Data transfer unit 96 stores the data transaction information in DTQ 12 and performs the functions required during a data tenure.

DBG and DTI value recognition unit 94 receives the individual data bus grant signal DBG1 and the DTI value from arbiter 40. Note that according to one embodiment, the DTI signals are broadcast to all devices on the bus, whereas DBG1 is only signalled to device 10. In alternate embodiments each device may have dedicated DTI signals from arbiter 40 that are not connected to any other device in the system. DBG and DTI value recognition unit 94 then provides information to DTQ 12 for selection of an entry within DTQ 12 corresponding to a next transaction.

Master control unit 90 is bi-directionally coupled to address bus 60 where transaction information is provided by master control unit 90. Master control unit 90 is coupled to DTQ 12 and provides transaction information for device 10 to DTQ 12. Target determination unit 92 is also bi-directionally coupled to address bus 60. Target determination unit 92 uses address information received from address bus 60 to determine when to assert a target indicator. When device 10 detects that it is the target of a transaction, target determination unit 92 provides a target indication identifying itself to arbiter 40. Device 10 snoops the bus for any transactions involving its address(es).

Figure 4:
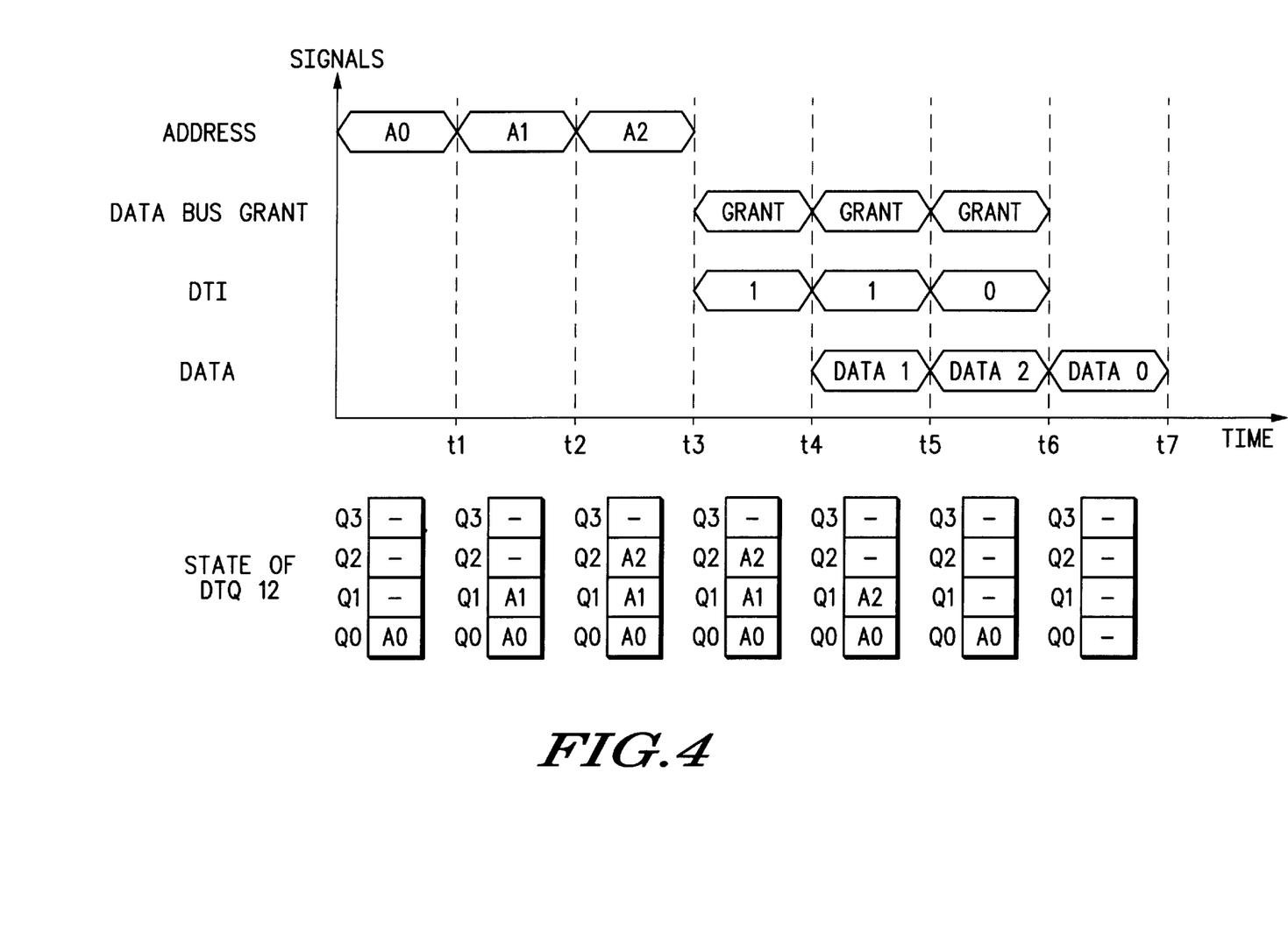
FIG. 4 illustrates, in timing diagram form, operation of one embodiment of the present invention.

FIG. 4 illustrates, in timing diagram form, operation of data processing system 5 of FIG. 1. The horizontal axis represents time where time divisions are made at t1, t2, t3, t4, t5, t6, and t7. The vertical axis is used to indicate binary voltage levels of various signals within data processing system 5. Below each of the specified time periods is an exemplar of the queue resident in device 10. The state of the queue is at the end of the cycle. This information provides the state of DTQ 12 during each time period.

Address information is provided on address bus 60 where during a first time period from 0 to t1, address A0 is active on the bus. Address A0 is provided from one of the devices resident on the bus. The vertical axis also illustrates the data bus grant signal, the data transaction index (DTI) and the data signal. Data is provided on data bus 50. During time period ending at t1, address A0 is active on the address bus and, as illustrated in the queue provided below time period t1, A0 provides information which is stored in the Q0 entry of DTQ 12. According to one embodiment, DTQ 12 does not store the entire information broadcast as address A0, but stores an indication of the transaction corresponding to address A0.

During the next time period between t1 and t2, address A1 is active on the address bus. At the end of this time period, DTQ 12 has an address indicator corresponding to address A1 stored in entry Q1 of the queue. Note that entry Q0 of DTQ 12 remains A0. Similarly, in the time period starting at t2 and ending at t3, address A2 is active on the address bus. The state of DTQ 12 at time t3 has a transaction indicator corresponding to address A2 in entry Q2, a transaction indicator corresponding to A1 in entry Q1, and a transaction indicator corresponding to A0 in entry Q0. During the time period from t3 to t4, the data grant is provided to device 10. Also during this time period, the DTI provided by arbiter 40 has a value of 1, which corresponds to the Q1 entry in DTQ 12. This results in DATA1 being provided on the data bus between t4 and time t5. DATA1 corresponds to address A1.

At time t5, the transaction indicator corresponding to A1 is removed from the queue and the transaction indicator corresponding to A2 moves into the entry Q1 of the queue. Similarly, the transaction indicator corresponding to A0 is in entry Q0. Also during this time period, the data bus grant signal, DBG1, is provided to device 10. Note that once again the DTI has a value of 1, which corresponds to the Q1 entry in DTQ 12.

During the next cycle starting at t5 and ending at t6, DATA2 is provided on the data bus 50. DATA2 corresponds to address A2, which is in entry Q1 of the queue. Now the queue is updated as A2 is removed from position Q1 and the only remaining entry is the indicator corresponding to A0 which is an entry Q0 of the queue. Also during this time period, the grant signal is once again asserted to device 10, and the DTI is provided at a value of 0.

During the last cycle indicated in FIG. 4, the grant signal is not asserted to device 10, therefore, device 10 is not responsive to the DTI value generated on the system. The DATA0 corresponding to the DTI for the last cycle is provided on the bus. Note that the provision of data lags the assertion of the grant signal by one cycle in FIG. 4. In alternate embodiments, the data lags assertion of the data bus grant signal by any amount of time. Here for the time period t6–t7 there are no transaction indicators stored in the queue of device 10.

Figure 5:
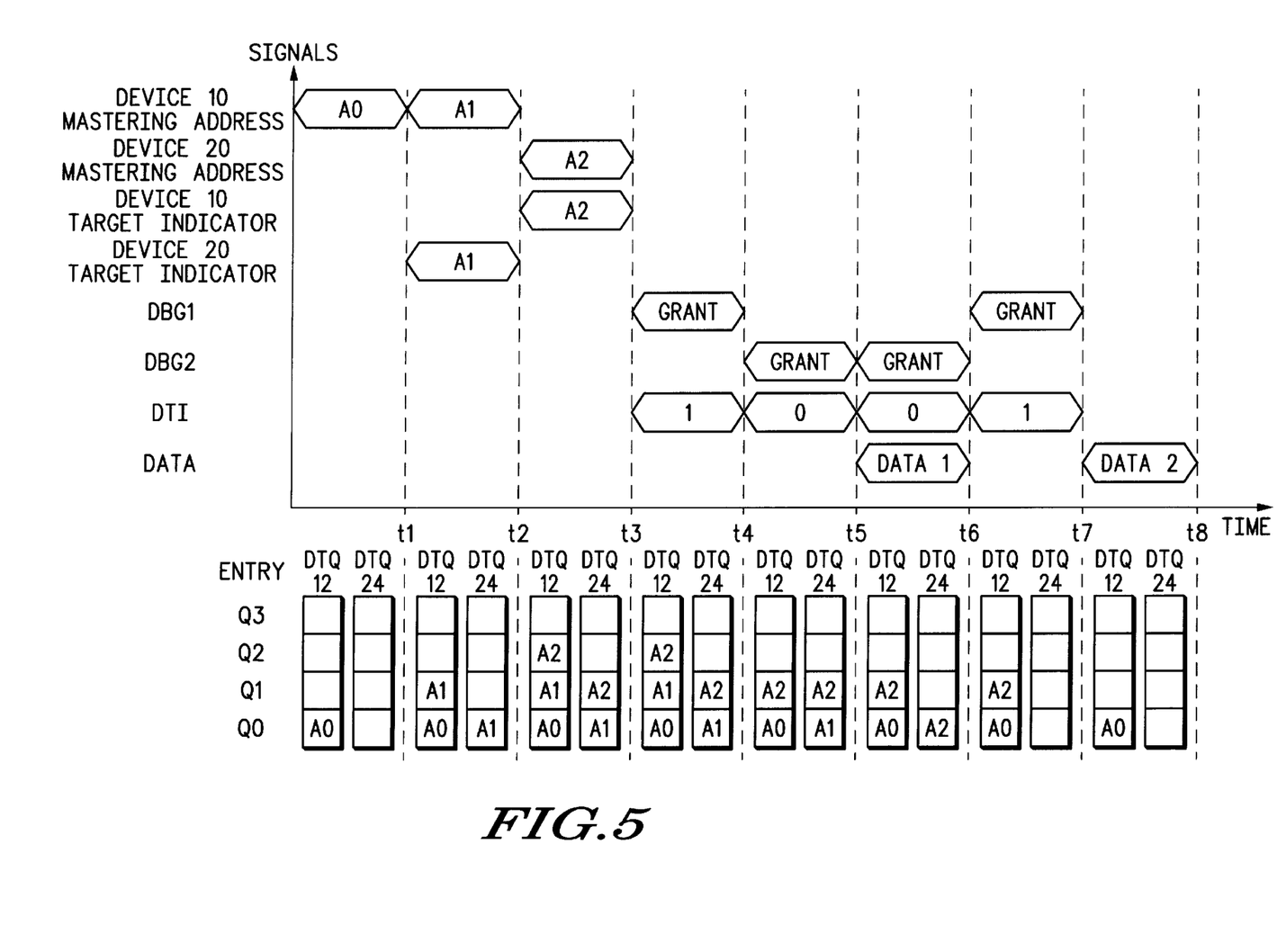
FIG. 5 illustrates, in timing diagram form, operation of one embodiment of the present invention.

FIG. 5 illustrates, in time and diagram form, an example of the operation of data processing system 5 according to one embodiment of the present invention. Here device 10 and device 20 are involved in at least one transaction. FIG. 5 has a horizontal axis representing time, including time periods indicated by t1, t2, t3, t4, t5, t6, t7, and t8. The vertical axis represents the various signals within data processing system 5. Signals include device 10 mastering the address, where address information is provided by device 10 on address bus 60. The signals also include device 20 mastering the address, which indicates the address information provided by device 20 on address bus 60.

Further, device 10 and device 20 target indicators are illustrated, where the device target indicator is provided from each device to arbiter 40. DBG1 and DBG2 are also included in the signals illustrated in FIG. 5. DBG1 is the data bus grant signal provided by arbiter 40 to device 10, and DBG2 is the data bus grant signal provided from arbiter 40 to device 20. Further, data transaction index information (DTI) is also indicated in FIG. 5. Note that according to one embodiment, DTI is provided by arbiter 40 to all devices within the system.

Finally, along the vertical axis, DATA is illustrated, which indicates the data information active on data bus 50. Below each time period, two queues are illustrated. The first queue, located on the left side, represents DTQ 12 which is the data transaction queue of device 10. The second queue, located on the right side, represents DTQ 22, which is the data transaction queue of device 20. During the time period ending at t1, DTQ 12 has a transaction indicator corresponding to address A0 in the entry Q0 with all other entries empty. Also during this time period, DTQ 24 has all entries empty. As illustrated during this first time period device 10 is the master and it is providing address information corresponding to address A0 on the address bus 60. The address A0 indicates a specific transaction which is to be performed, where a transaction indicator is information stored in DTQ 12. The transaction indicator typically includes an address plus a transaction type. The transaction type may be a read, a write, or a read with intent to modify. Alternate embodiments may include the number of bytes to transfer in a burst type transaction or transaction size.

During the second time period starting with t1 and ending at t2, device 10 again is master of the address bus and this time provides address A1 on the address bus 60. Address A1 also has a corresponding transaction, where transaction information corresponding to address A1 is stored in DTQ 12 at entry Q1. When device 10 provides address A1 on address bus 60, device 20 is snooping the address bus to monitor for a transaction in which it is involved. Also during this time period, device 20 determines that it is a target of the transaction indicated by address A1, and therefore asserts its target indicator to arbiter 40. In this way device 20 acknowledges to arbiter 40 that it is the target device involved in this transaction. Device 20 may be a sink or a source in this transaction. Note that this indicates to arbiter 40 that transaction indication information associated with address A1 is to be stored not only in DTQ 12 but also in DTQ 24 which is the data transaction queue of device 20.

During the next time period starting at t2 and ending at t3, device 20 is now master of the address bus for the transaction associated with address A2. Device 2 provides address A2 on address bus 60. During this time period, device 10 is snooping the address bus and discovers that it is to be the target of the transaction indicated by address A2. In response device 10 asserts its target indicator to arbiter 40. At time t3, DTQ 12 contains a transaction indicator corresponding to address A2 in entry Q2, a transaction indicator corresponding to address A1 in entry Q1, and an address indicator corresponding to address A0 in entry Q0. Similarly, DTQ 24 includes a transaction indicator corresponding to address A2 in entry Q1 and corresponding to address A1 in entry Q0. Note that in the cycle from t1 to t2 and in the cycle from t2 to t3, those queues contain identical transaction indicators but in different positions. During the first time period from t1 to t2, a transaction indicator corresponding to address A1 is located in entry Q1 of DTQ 12 but in entry Q0 of DTQ 24. Similarly during the time period from t2 to t3, a transaction indicator corresponding to address A2 is stored in entry Q2 of DTQ 12 but in entry Q1 of DTQ 24. Note that in other embodiments of this invention, there may be a delay between an address tenure and the associated target indicator.

During the next cycle from t3 to t4, arbiter 40 asserts the data bus grant signal DBG1 which grants the data bus to device 10, indicating that device 10 will be involved in the next transaction. At the same time the DTI signal is provided at a value of 1, indicating the transaction in entry 1 of DTQ 12 will be the next data transaction. The information in entry 1 of DTQ 12 indicates that the next transaction will involve data corresponding to address A1. Device 10 may provide the data corresponding to address A1 or it may receive the data corresponding to address A1. The transaction identifier provides information on whether device 10 will be a source or a sink for this transaction. In this case device 10 will sourcing the data, but since transaction indicators corresponding to address A1 are located at different positions in DTQ 12 and DTQ 24, it is necessary to grant the data bus to the source and to the sink in different cycles.

In this way during the next cycle from t4 to t5 the arbiter 40 asserts DBG2 to device 20 which grants the data bus to device 20. Note that in this transaction device 10 is the source and device 20 is the sink, but it is possible in a similar transaction for device 10 to be the sink and device 20 to be the source. Also the order of provision of DBG1 and DBG2 does not necessarily indicate which is a source and which is a sink. During the cycle starting from t4, arbiter 40 provides DBG2 to device 20. Also during this time, DTI is provided at a value of 0. This is necessary as address A1 is in entry 0 of DTQ 24 which corresponds to DBG2. In this way provision of the data bus grant signal coupled with the value of the DTI provides an indication of the transaction indicator to be used for each device.

In the time period starting at t5 and ending at t6, DATA1 which corresponds to the transaction corresponding to address A1 is provided on data bus 50. During this cycle DBG2 is provided by arbiter 40 to device 20, and DTI is provided by arbiter 40 at a value of 0. This indicates that the next transaction corresponds to address A2. Note that during this time period DTQ 12 contains a transaction indicator corresponding to address A2 in entry Q1 and address A0 in entry Q0. Whereas DTQ 24 contains a transaction indicator corresponding to address A2 in entry Q0.

In the next cycle starting at t6, arbiter 40 asserts DBG1 granting the data bus to device 10. At the same time DTI is provided at a value of 1. This indicates that the first entry in DTQ 12 represents the transaction. Here the transaction corresponds to address A2. In the next time period starting at t7, DATA2, which corresponds to address A2, is provided on data bus 50. Here the state of the DTQ 12 has entries Q1 through Q3 empty and a transaction indicator corresponding to address A0 is contained in entry Q0. All entries of DTQ 24 are empty.

Figure 6:
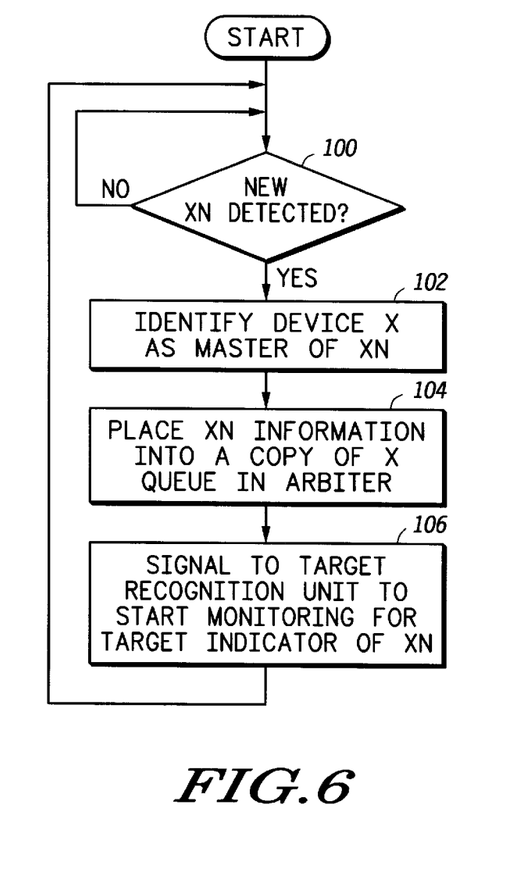
FIGS. 6–11 illustrate, in flow diagram form, operation of one embodiment of the present invention.

Operation of arbiter 40 is further illustrated in FIG. 6, where a flow chart is used to track operation of each module within arbiter 40. Reference is made to FIG. 2, where a detailed illustration of arbiter 40 includes master recognition unit 70, target recognition unit 72, and DBG and DTI generation unit 74. FIG. 6 illustrates the operation of master recognition unit 70. Referring to FIG. 6, process flow begins with decision diamond 100, where it is determined if a new transaction has been detected. Note that in the notation used in FIGS. 6–11 a transaction is indicated as "XN." Proceeding from decision diamond 100, if a new transaction is not process flow returns to decision diamond 100 to continue to monitor for a new transaction. If a new transaction is detected process flow continues to block 102. Here a device "X" is identified as master of the transaction. Process flow continues to block 104, where transaction information is placed into a copy of the queue corresponding to device X. The copy of the queue corresponding to device X is resident in block 44 of arbiter 40 of data processing system 5, as illustrated in FIGS. 1 and 2. Process flow continues to block 106 to start monitoring for a target indicator for the current transaction. The monitoring is performed by target recognition unit 72. Master recognition unit 70 provides information to target recognition unit 72 to initiate monitoring address bus 60. Process flow within master recognition unit 70 then continues back to decision diamond 100 to wait for a next transaction.

Figure 7:
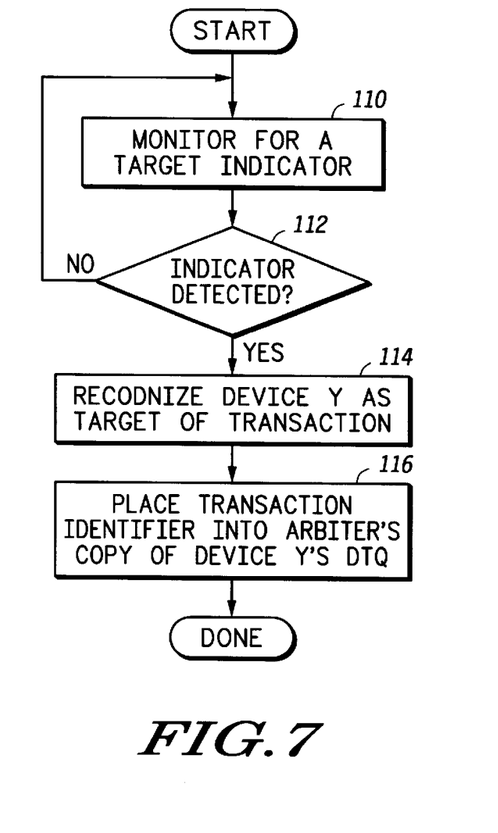

The flow within target recognition unit 72 is further illustrated in FIG. 7. Block 106 initiates operation of target recognition unit 72, starting at block 110. Process flow continues to decision diamond 112, where it is determined if a target indicator has been detected for this transaction. If no indicator is detected process flow returns to decision diamond 112. If the target indicator is detected, process flow continues to block 114, where the target device "Y" is identified for this transaction based on the target indicator information. Process flow continues to block 116 where a transaction identifier corresponding to the transaction is also placed into a copy of device Y's queue, resident in arbiter 40. Note that the queue corresponding to device Y is contained within the multiple queues of block 44 illustrated in FIG. 2. Once the transition identifier has been stored into the copy of Y's queue, process flow for target recognition unit 72 is complete.

Figure 8:
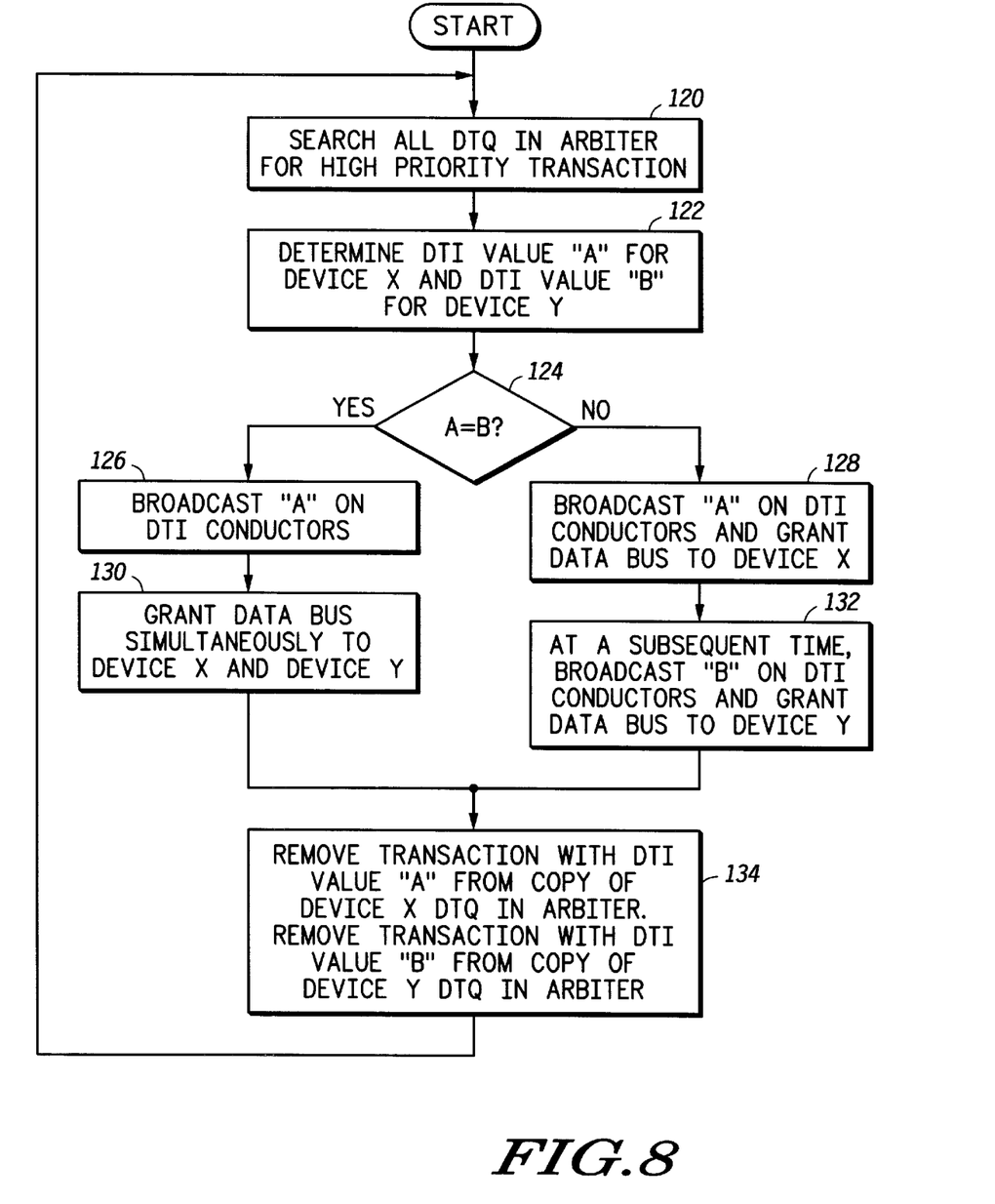

FIG. 8 illustrates the operation of DBG and DTI value generation unit 74. Process flow begins at block 120 to search all of the data transaction queues (DTQs) contained in block 44 of arbiter 40. Block 44 is searched to find a priority transaction which is to be performed next. This may be a highest priority, or may be selected according to some other priority scheme. Typically the selection of a next transaction is based on the considerations of maximizing utilization of the data bus. In this way transactions which require long latency on the data bus are reordered such that those latency periods are filled with the transfer of data for out of order transactions.

Process flow then continues to block 122, to determine a data transaction index (DTI) value "A" corresponding to data source device X for this transaction and DTI value "B" corresponding to data sink device Y for this transaction. Here device X will provide the data and device Y will receive the data. Note that the indication of source and sink is not an indication of master and/or slave, but rather indicates direction of data flow within data processing system 5. The sink and source indication is contained in the transaction indicator which is stored in the DTQs.

Process flow then continues to decision diamond 124 to determine if the DTI value corresponding to device X is equal to DTI value corresponding to device Y, i.e. if A=B. Note that the DTI value according to one embodiment of the present invention is the position in the respective queues. Therefore the DTI value for device X will be the position of the transaction indicator for this transaction within the copy of the queue corresponding to device X. Similarly the DTI value for device Y will be the position in the copy of the queue corresponding to device Y where the transaction indicator corresponding to this transaction is stored.

If both DTI values are equal, process flow continues to block 126 where the DTI value is provided to data bus 50 on the DTI conductors. Process flow then continues to block 130 where arbiter 40 simultaneously grants the data bus to device X and to device Y. This is done by simultaneously asserting the DBG signals going to devices X and Y. Data flow then continues to block 134. At block 134 the transaction indicators corresponding to this transaction are then removed from each from the associated queues within block 44 of arbiter 40. Process flow then returns to block 120 to search the queues of block 44 for the next priority transaction.

Returning to decision diamond 124, if the DTI values corresponding to device X and device Y are not equal, process flow continues to block 128. At this point the transaction index corresponding to this transaction for device X is provided to data bus 50 on the DTI conductors. In this way, the DTI value is broadcast within data processing system 5. At the same time one DBG signal is provided to device X. No bus grant signal is provided to device Y at this time. Process flow then continues to block 132, where at a subsequent time, the DTI value corresponding to the transaction for device Y is provided on data bus 50 and at the same time, the DBG signal for device Y is provided to device Y. In this way, during a first time period, the DTI and DBG combination indicates the position of the transaction indicator in device X's DTQ. At a subsequent time, the DBG and DTI combination provides information about the position of the transaction indicator in device Y's DTQ. This is necessary as block 44 of arbiter 40 contains copies of the queues that are resident in each of the devices. For a given transaction, where the position of the transaction indicator is different for the DTQs of device X and device Y, it is not sufficient to provide the position of only one. Rather, the position of the transaction indicator in the DTQs of device X and device Y is determined to affect the transaction. By time shifting this information, each device is able to locate the transaction indicator when it receives a data bus grant signal. Note that while the DTI value is generated to all devices within the processing system 5, each device has an individual data bus grant signal. For an alternate embodiment, where each device receives its own DTI signal from the arbiter, it is possible to issue DBG and DTI signals to both devices involved in the transaction simultaneously, even if the DTIs are not the same.

The processing flow continues to block 134. At block 134 the transaction indicators corresponding to this transaction are then removed from each from the associated DTQs within block 44 of arbiter 40. Process flow then returns to block 120 to search the copies of DTQs within block 44 for the next priority transaction.

Figure 9:
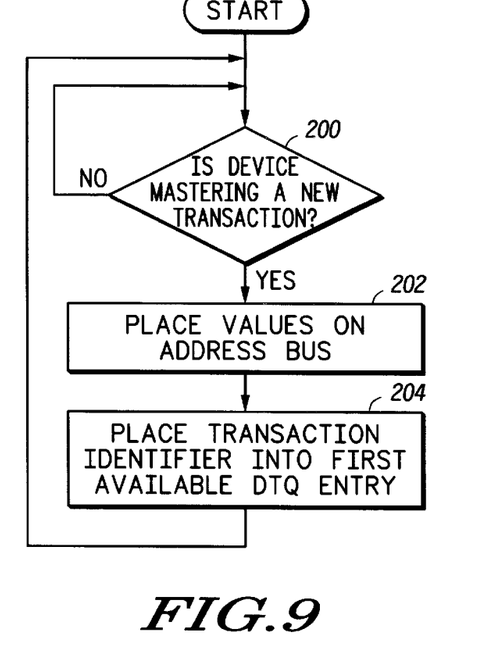

Referring to FIG. 3, device 10 is illustrated in detail. The operation of device 10 is illustrated in FIG. 9. Device 10 includes master control unit 90, target determination unit 92, and DBG and DTI value recognition unit 94. Processing flow begins at decision diamond 200 to determine if this device is mastering a new transaction. This decision determines if device 10 will be providing information on address bus 60. If this device is not mastering an address tenure, the process flow returns to decision diamond 200. If this device is the master, process flow continues to block 202 where address values are placed on address bus 60. Process flow then continues to block 204 where a transaction identifier is placed into the first available entry, or tail, of the data transaction queue 12. The master adds a new transaction to the tail of its DTQ with each transaction start for a transaction that requires a data tenure. The process flow then returns to decision diamond 200.

Figure 10:
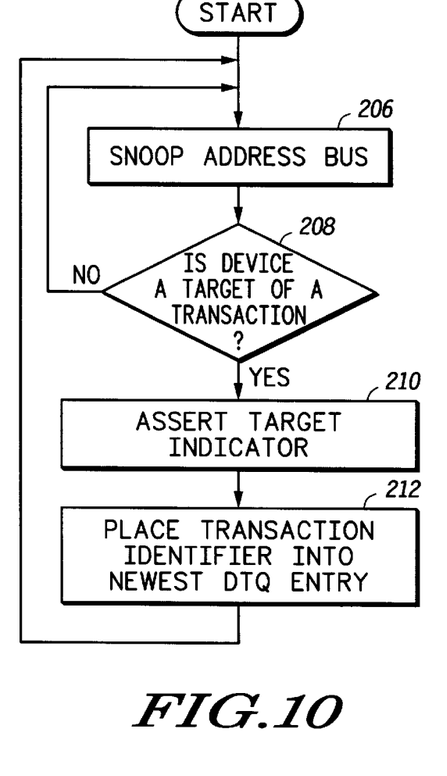

FIG. 10 illustrates the process flow of target determination unit 92 within device 10. Here process flow begins at block 206 where device 10 snoops address bus 60. The snooping is done to determine if device 10 is the target of any transaction which is being specified on address bus 60. The process flow then continues to decision diamond 208 to determine if device 10 is a target of a transaction. If it is not a target, process flow returns to block 206 to continue snooping. If the device is a target of a transaction, process flow continues block 210, where the target indicator is asserted providing an indication to arbiter 40 that this device is to be involved in the next transaction. When arbiter 40 receives the target indicator, it knows to store transaction indicator information in the queue associated with this device. Process flow then continues to block 212, where a transaction identifier is placed into the first available entry in the DTQ of the device. The process flow then continues by returning to block 206.

Figure 11:
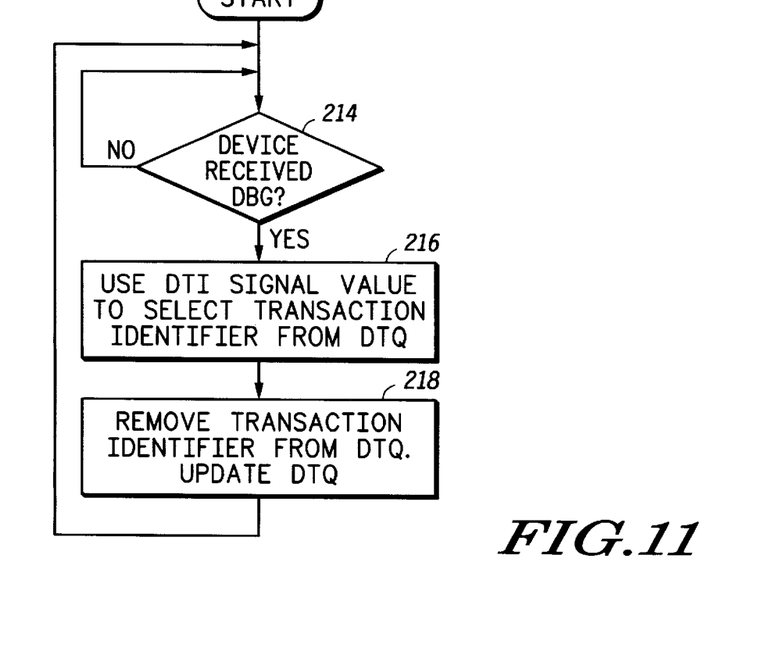

FIG. 11 illustrates operation of DBG and DTI value recognition unit of device 10. Here process flow begins at decision diamond 214 to determine if the DBG signal has been provided for this device. If the data bus grant has not been received, process flow returns to decision diamond 214. If the DBG signal has been received, process flow continues to block 216. Here the DTI signal value is used to select a transaction identifier from the data transaction queue 12. Process flow then continues to block 218 to remove the transaction identifier from DTQ 12 and update DTQ 12. The process flow then returns to decision diamond 214.

Although the invention has been described and illustrated with reference to specific embodiments, it is not intended that the invention be limited to those illustrative embodiments. Those skilled in the art will recognize that modifications and variations may be made without departing from the spirit and scope of the invention. Therefore, it is intended that this invention encompasses all the variations and modifications as fall within the scope of the appended claims.

The present invention allows for reordering of data transactions on a split communication bus, while eliminating the requirement of including tag information with the address portion of the transaction. This allows for full out-of-order data transfers by using an age-based data transaction index. This index is only used during a data tenure. The maximum number of pending transactions allowed will determine the minimum size of the index.

According to one embodiment, by maintaining a data transaction queue in each device coupled to the bus and a copy of each queue in a central arbitration unit, it is possible to coordinate a single transaction between two devices with different queue conditions. A data transaction index is used to locate the position in the queue of the next transaction; the data transaction index is broadcast to all devices in the system. Individual data bus grant signals are provided to each device in order to distinguish between them.

One embodiment of the present invention provides different transaction information to the source and sink devices of a single transaction using only one set of signals to both devices. This is accomplished by time multiplexing the information to the devices. This coordinates the states of each device and provides the advantage of using only one set of bussed signals to generate multiple transaction information for the same transaction.

We claim:

1. A method of operating a data processing system comprising:
   storing a first transaction;
   assigning a first transaction index value to the first transaction;
   storing a second transaction, wherein the first transaction has been pending longer than the second transaction;
   assigning a second transaction index value to the second transaction; and
   executing one of the first and the second transactions;

wherein if the first transaction is executed, changing the second transaction index value in response to executing the first transaction; and if the second transaction is executed, retaining the first index transaction value in response to executing the second transaction.

2. A data processing system, comprising:

a first circuitry capable of receiving a plurality of transactions comprising a first transaction and a second transaction;

a second circuitry capable of assigning a first transaction index value to the first transaction and a second transaction index value to the second transaction;

a third circuitry capable of executing a selected one of the first and second transactions; and a fourth circuitry capable of changing the second transaction index value in response to the third circuitry executing the first transaction if the first transaction has been pending longer than the second transaction and retaining the second transaction index value in response to the third circuitry executing the first transaction if the second transaction has been pending longer than the first transaction.

3. A method of operating a processor, comprising:

providing a plurality of transactions;

assigning transaction index values to the transactions according to the age of the transactions;

selecting any one of the transactions for execution;

executing the selected transaction;

changing the transaction index values of each of the transactions that are younger than the selected transaction in response to the selected transaction being executed; and retaining the transaction index values of each of the transactions that are older than the selected transaction in response to the selected transaction being executed.

4. A processor, comprising:

means for storing a plurality of transactions;

means for assigning transaction index values to the transactions according to the age of the transactions;

means for selecting any one of the transactions for execution and executing the selected transaction; and means for changing the transaction index values of each of the transactions that are younger than the selected transaction retaining the transaction and index values that are older than the selected transaction in response to the selected transaction being executed.

* * * * *

UNITED STATES PATENT AND TRADEMARK OFFICE
CERTIFICATE OF CORRECTION

PATENT NO. : 6,240,479 B1
DATED : May 29, 2001
INVENTOR(S) : Snyder et al.

Page 1 of 1

It is certified that error appears in the above-identified patent and that said Letters Patent is hereby corrected as shown below:

<u>Column 12, claim 4,</u>
Line 22, insert -- and -- after "transaction".

Signed and Sealed this

Nineteenth Day of March, 2002

Attest:

JAMES E. ROGAN
*Director of the United States Patent and Trademark Office*

*Attesting Officer*